United States Patent [19]

Takami et al.

[11] 4,090,081

[45] May 16, 1978

[54] SCINTILLATOR FOR GAMMA RAY CAMERA

[75] Inventors: Katsumi Takami, Tokyo; Ken Ueda, Hachioji; Fumio Kawaguchi, Kokubunji; Teruichi Tomura, Kunitachi; Kenji Ishimatsu, Abiko, all of Japan

[73] Assignee: Hitachi Medical Corporation, Japan

[21] Appl. No.: 709,384

[22] Filed: Jul. 28, 1976

[30] Foreign Application Priority Data

Jul. 28, 1975 Japan .................................. 50-91112

[51] Int. Cl.² ................................................ G01T 1/20
[52] U.S. Cl. ................................ 250/368; 250/361 R; 250/367

[58] Field of Search ..................... 250/367, 368, 361

[56] References Cited

U.S. PATENT DOCUMENTS

| | | | |
|---|---|---|---|
| 2,666,145 | 1/1954 | Eversole et al. | 250/367 |
| 2,727,154 | 12/1955 | Goldsworthy | 250/367 |
| 3,102,955 | 9/1963 | Carlson | 250/368 |
| 3,898,463 | 8/1975 | Noakes | 250/367 |

*Primary Examiner*—Archie R. Borchelt
*Attorney, Agent, or Firm*—Craig & Antonelli

[57] ABSTRACT

A scintillator for a gamma ray camera includes a pair of crystals mechanically pressed together. The surfaces of the crystals are roughened so as to form a photo-diffuser for the light generated as a result of scintillation.

20 Claims, 5 Drawing Figures

SCINTILLATOR FOR GAMMA RAY CAMERA

BACKGROUND OF THE INVENTION

1. Field of the Invention

The present invention relates a scintillator for a gamma ray camera, particularly one in which the crystals form a photo-diffuser for the light generated by scintillation.

2. Description of the Prior Art

Photomultiplier tube structure associated with gamma ray cameras is typically situated far apart from the scintillation light source crystals in order to receive a minimum amount of extraneous light, in order to reduce noise inputs associated with photoelectrons generated at positions with respect to which an individual photomultiplier tube structure is not in alignment. Namely, a large weighting functin $Kj$ causes statistical fluctuations in the generation of the photoelectrons to be excessively emphasized, thereby deteriorating the resolution of the camera.

In an ideal case, it is preferred that gamma ray cameras have a construction such that respective photomultiplier tube structures are be aligned with points of generation of scintillation light from the surface of the gamma ray scintillator camera. Looking at FIG. 1 of the drawings of the present application, for example, there is shown a light source crystal 3 with a scintillation point P generating light upon the incidence of gamma rays, a window 2 and a optical guide 1. Ideally, respective photomultipliers $PM_{i-3} - P_n+1$, where $i$ is an integer, are disposed to receive, exclusively, the respective light rays emitted from the surface of the optical guide 1, originating at the point P in the scintillating crystal 3. For an ideal light spread function $Fj(x)$ the light which is incident upon an individual photomultiplier, such as photomultiplier $PM_{i-2}$ does not spread to be incident upon adjacent photomultplier structure. In reality, however, there is a considerable amount of spread of the light generated and various techniques have been proposed to improve the resolution reduced due to light spread.

One technique is the employment of a threshold-amplifier device which limits the signal obtained from a photomultiplier spaced apart from an adjacent photomultiplier, so as to remove signals derived from fluctuations in the generation of photoelectrons. Another technique employs a delay line which reduces the weighting function multiplied by signals generated from a photomultiplier with statistically fluctuating photoelectrons to zero.

SUMMARY OF THE INVENTION

In accordance with the present invention, the resolution of a gamma ray camera is improved by constructing the scintillating crystals to act as a photodiffuser so as to substantially reduce the noise inputs to the photomultiplier tube structure. For this purpose, the surfaces of the scintillating crystals are roughened and the thicknesses of the crystals are varied in a fashion to reduce the spread effect of the light generated in the crystals due to scintillation. The individual crystals, the surfaces of which are roughened, are mechanically bonded together to form a photo-diffusing structure and the light produced due to scintillation results in the photomultiplier structure associated with the source having a significantly improved signal to noise ratio.

DETAILED DESCRIPTION

Figure 4:
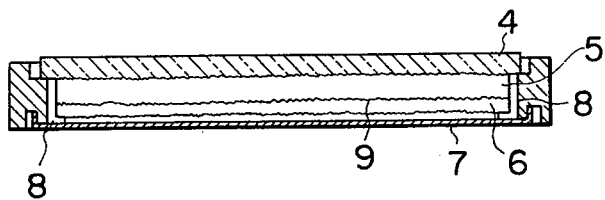
FIG. 4 is a sectional view of the construction of an embodiment of a scintillator having a photo-diffuser configuration.

FIG. 4 illustrates a cross-sectional view of the scintillator crystal structure in accordance with the present invention which includes a pair of fixed crystals 5 and 6, the front and back surfaces of which are roughened and are joined together by mechanical pressure. A window 4 made of a material such as Pyrex glass is disposed at the top surface while a perfect diffusion reflector 7, made a material such as $Al_2O_3$, MgO, $BaSO_4$, etc., is diposed on the lower surface of the crystal scintillator structure. An elastic material 8 mechanically press fits the crystals 5 and 6 to a surrounding case as shown. The glass 4 and the crystal 5 are joined together through the use an epoxy adhesive or are optically coupled through the use of silicon oil. The crystals 5 and 6 themselves may be NaI(Tl) crystals.

In the arrangement shown in FIG. 4, the individual crystals 5 and 6 are roughly polished to have a roughness from 800 to 120 according to Japanese industrial standards on the front, back and side surfaces of each crystal. The crystals are joined together so that the total thickness of the superimposed combination is between 10 and 15mm. The thickness of crystal 6 desirably ranges from 0.5 to 6mm.

Figure 5:
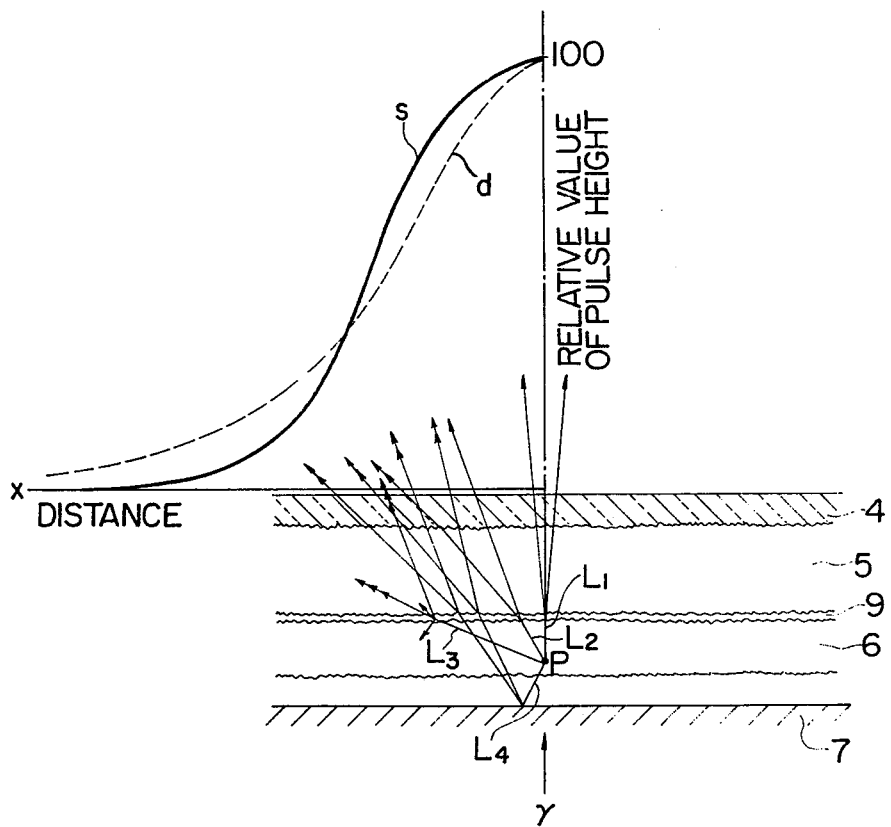
FIG. 5 is a graph illustrating the relationship between the diffusion of light and light distribution in a scintillator crystal having photodiffusor structure as shown in FIG. 4.

When the crystal 5 and 6, the surfaces of which have been polished in the manner described, are joined together, and adjacent surfaces have minute air gaps therebetween to result in a diffusing gap 9 as shown in FIG. 5. Silicon oil or epoxy resin may be used to optically couple the crystals 5 and 6 together and to form a complete mechanical bond therebetween.

The light emission and diffusion characteristics of the scintillator structure shown in FIG. 4 are illustrated in FIG. 5. The lower portion of FIG. 5 is an enlarged partial sectional view of the scintillator shown in FIG. 4, with point P in the crystal 6 identifying a point at which scintillation light is generated in response to the incidence of gamma rays in the direction as shown. From the point P light will be generated in three dimensions so as to have vertical upward, sideward and vertical downward components.

The upperwardly directed light rays L1 are diffused to some degree by the diffuser 9 and, upon impinging upon crystal 5, are slightly diffused again at the roughly polished surface and then projected outwardly from window 4. The light rays L2 diffused at a more substantial angle from the normal to the scintillator structure are more substantially diffused by the photo-diffuser 9 in a manner such that both the angle of incidence and the vertical component are equal in the direction toward crystal 5. The light rays L3, directed at an even greater angle with respect to the normal to the surface, are completely diffused by the diffuser 9 so as to have also all vertical components removed. Instead, the light rays L3 are split up into downwardly travelling components and further vertical components.

From the point P there are also generated light rays L4 directed downwardly which are slightly diffused at the roughly polished surface of the crystal 6 and are reflected at the perfect diffusion reflector 7. When the light is incident in a direction normal to the surface of reflector 7, reflector 7 will completely diffuse the light in a substantially ideal manner. However, any horizontal component or component in parallel with the surface of the diffuser 7 reduces the amount of diffusion and causes the light to be reflected vertically toward the crystal 6. These latter light ray components are greatly diffused at the photodiffuser 9 and are slightly diffused at the roughly polished surface of the crystal 5 and are projected outwardly from the window 4.

The resulting scintillation characteristic within the crystal 6 for gamma rays having low energy is substantially trapezoidal as designated by the solid line S in FIG. 5. Yet, where the energy of the gamma ray input to the scintillator is increased, the resulting scintillator characteristic for both crystals 5 and 6 departs from the ideal characteristic S and becomes closer to the characteristic designated by the broken line $d$ in FIG. 5. However, since the high energy gamma ray has a high light quantum value N, a high resolution can still be obtained. Accordingly, it can be seen that the scintillator crystal structure of the present invention approaches the ideal light distribution trapezoidal function for low energy input gamma rays and still permits a high resolution to be achieved for high energy input gamma rays.

Figure 2:
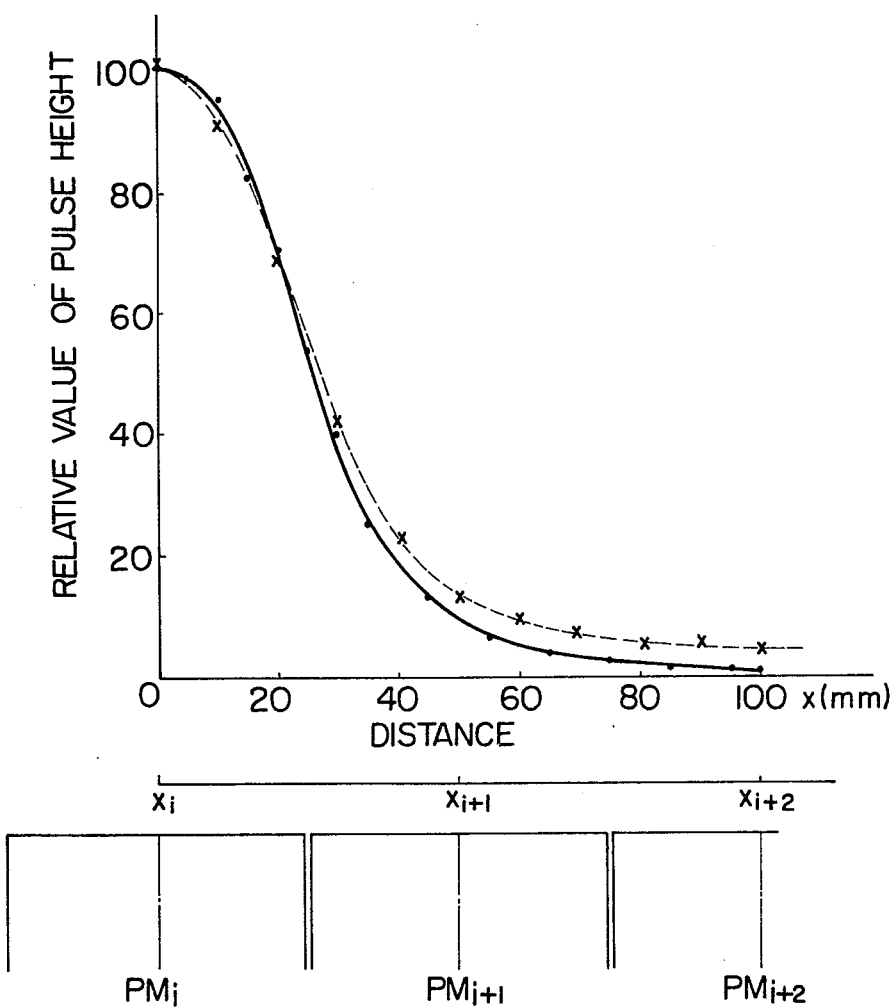
FIG. 2 is a graph of the characteristics of experiments carried out on scintillator crystal structure.

Description will now be presented of experimental results carried out by the inventors during actual measurements of the light distribution obtained by varying the thickness of an NaI(Tl) crystal, the entire surfaces of which were polished to a roughness of number 220 according to Japanese industrial standards, while the vertical distance between the light source and the photomultiplier was maintained constant. Attention is directed to FIG. 2 which illustrates the results of these experiments. The vertical axis represents pulse height while the horizontal axis represents the distance in millimeters from the light source. The pulse height is designated in relative values in a range from zero to 100 for purposes of simplification. Beneath the horizontal axis reference numbers $x_1$, $x_{i+1}$ and $x_{i+2}$ represent the respective axes of photomultiplier tubes $PM_i$, $PM_{i+1}$ and $PM_{i+2}$. The solid line in FIG. 2 indicates the relative values of pulse height of an NaI(Tl) crystal 5 milimeters in thickness, with the window having a thickness of 10 milimeters and the optical guide having a thickness of 3 millimeters. The gamma ray input corresponded to a gamma ray from $^{57}$Co.

The broken line represents the characteristics of an NaI(Tl) crystal the thickness of which is 12.7 mm, with a window thickness of 5 mm with no optical guide and the gamma ray source being the same as that for the solid line.

Even though both light scintillating crystals are substantially the same direction from the photomultiplier tube, on the order of 18 millimeters, it can be seen that there are substantial differences in the light distibution at a distance in the neighborhood of the axial center $x_{i+1}$ of photomultiplier $PM_{i+1}$ adjacent the light source ($x = 0$ or $x = x_i$). The deviation becomes greater at the position $x_{i+2}$ of the photomultiplier $PM_{i+2}$ even further disposed apart from the light source at the position, $x_i$, as shown.

The reasons for the differences in the characteristic as the distance from the tube $PM_i$ increases are believed to be as follows. When the surface of material having a high index of refraction is roughened or roughly polished and light passes through the roughly polished surface toward a material having a low index of refraction, the diffusion of light incident upon the polished surface along a vertical line, namely normal to the overall surface, it not generally great. However, light which is incident at an angle to the normal is significantlly diffused and the more roughly the surface is polished, the more remarkable the diffusion.

For gamma ray inputs from $^{57}$Co, must of the scintillation occurs at the surface of the crystal upon which the gamma rays are incident so that this portion of the crystal can be referred to as a bottom layer light source. If the crystal is thick, the light propagates through a substantial amount of crystal material and is then diffused at the polished surface so that the angle of incidence of the light at the polished surface is small, so that the degree of diffusion is slight. Accordingly, as the angle of incidence of light upon a photomultiplier tube, spaced apart from the one which is in alignment with the normal to the surface and with the point in the crystal from which light is generated as a result of scintillation, increases, the degree of diffusion at the surface of the crystal increases, and the amount of light from that point source incident upon the spaced apart photomultiplier tube decreases, so as to result in a decreased pulse height output shown in the broken line in FIG. 2.

Moreover, if the thickness of the crystal is reduced, the roughly polished surface will be closer to the vicinity of the point where the scintillation light is generated so that most of the light is will be diffused light. Still, the photomultiplier tube located directly above the point of scintillation will receive a substantial amount of light and its characteristic will not be reduced. However, for the photomultiplier tubes which are spaced apart further from the point source of generation, due to the significant amount of diffusion, the light input thereon will be significantly reduced as shown by the solid line in FIG. 2. This means that the light distribution characteristic more closely approaches the ideal trapezoidal shape where the surfaces of the crystal are roughly polished and the crystal is made substantially thin. As a result, there is a significant change in the differential of the spread function $Fj(xj)$, namely $dFj(xj)/dx$.

Figure 1:
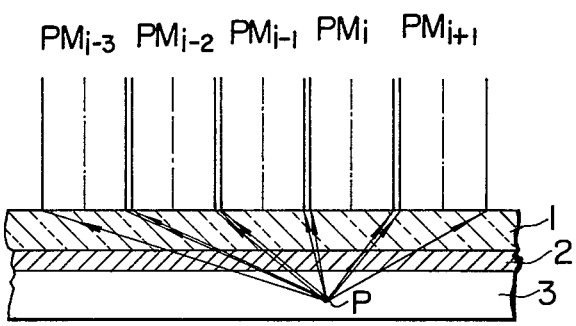
FIG. 1 is a partial corss-sectional view of a conventional scintillator crystal structure.
Figure 3:
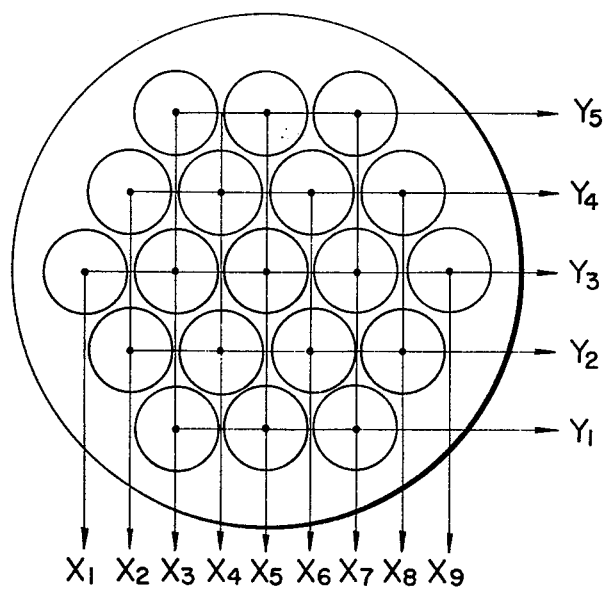
FIG. 3 is an end view of photomultiplier tube structure with connections for transmitting signals.

A further advantage of the improved light distribution characteristic which approaches an ideal trapezoidal shape may be explained with reference to FIG. 3 which shows an end view of an Anger camera using photomultiplier tubes in hexagonal alignment. Lines $Y_1$-$Y_5$ represent Y axis signal lines, while lines $X_1$-$X_9$ represent X axis signal lines. If the light distribution characteristic approaches the ideal trapezoidal shape, even if the signal lines are asymmetrically positioned between the X and Y axes, the position dependency of position sensitivity is reduced resulting in a substantial uniformity over the gamma ray camera. Thus, it is apparent that the thinner the crystal is made, the closer the light distribution characteristic approaches the ideal function.

The degree of reduction in thickness of the crystal is limited, however, since peak photo detection efficiency is decreased for high energy gamma rays. Reference may be had to the publication by H. O. Anger and D. H.

Davis, Review of Science Instruments, Volume 35 page 693, 1964.

With respect to the type of photodiffuser arrangement 9 to be used for mechanically coupling crystals 5 and 6 together, for a photomultiplier tube having a 3 inch diamter, the light distribution has a desirable trapezoidal shape and a broad width. In this case, it is preferable to mechanically press the crystals 5 and 6 together to increase the diffusion of light by the diffuser 9.

On the other hand, if the diameter of the photomultiplier tube is reduced on the order of two inches or less, it is preferable to provide a finely polished surface on each of the crystals 5 and 6 and then to rub each of the crystals together and to cause the crystals to adhere to each other with mechanical pressure or by way of silicon oil or epoxy rosin adhesive in order to narrow the width of the trapezoidal light output characteristic and to approach the ideal distribution characteristic.

The optimum range of thickness of the crystal 6 depends upon the diameter of the photomultiplier 2, the thickness of the optical guide, etc., which may be selected with respect to the diffusion of the photodiffuser 9. More specifically, for low energy nuclides of Tc(140KeV), the thickness of the crystal 6 may be selected in a range from 2 to 6 mm. However, when high energy nuclides impinge upon the crystal 6, the pulse height of the light received by the photomultiplier should not differ for light directed upwardly and light directed downwardly. As a result, the thickness of the crystal 6 will differ depending upon the degree of adherence by way of mechanical pressure and in the case of simple optical coupling, there may be so established that the pulse height of the light output is substantially the same regardless of the thickness employed. A range of thicknesses from 0.5 to 6 mm will insure that this occurs.

More than one layer may be employed for the photodiffuser, namely plural layers of superimposed photodiffusers may be used. Also, if the crystal 6 is thin and is joined with a thick crystal 5, since a gamma ray camera crystal has a considerably large diameter, the resulting structure becomes easily damaged and it becomes difficult to polish the crystal 6. Accordingly, the crystal 6 should first be joined with the crystal 5 and then polished to a desired thickness.

While we have shown a preferred embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a scintillator for an Anger type camera apparatus having
    a scintillating crystal structure for producing light rays; and
    means for coupling said light rays toward a photomultiplier;
    the improvement wherein
    said scintillating crystal structure includes a photodiffuser for forming a substantially trapezoidal light distribution characteristic.

2. The improvement according to claim 1, wherein said scintillating crystal structure is formed of a plurality of crystals having adjacent roughly polished contacting surfaces forming said photo-diffuser.

3. The improvement according to claim 2, wherein the thickness of said crystal structure lies in a range of 10 to 15 mm.

4. The improvement according to claim 2, wherein said contacting surfaces of said crystals are mechanically pressed together.

5. The improvement according to claim 4, wherein said crystals are mechanically pressed together by way of an elastic material joining the edges of said crystals together.

6. The improvement according to claim 2, wherein said contacting surfaces of said crystals are adhesively joined together.

7. The improvement according to claim 6, wherein said adhesive is silicon oil.

8. The improvement according to claim 6, wherein said adhesive is epoxy resin.

9. The improvement according to claim 2, wherein said plurality of crystals includes a crystal which produces light in response to the impingement of gamma rays thereon, the thickness of said crystal being in a range from 0.5 to 6 mm.

10. The improvement according to claim 9, wherein the thickness of said crystal lies in a range from 2 to 6 mm.

11. The improvement according to claim 1, wherein said scintillating crystal structure is formed of at least one crystal being a plate-like member having a first major surface facing toward said photomultiplier through said coupling means and a second major surface facing toward a perfect diffusion reflector, both of said first and second major surfaces being roughened to form said photo-diffuser.

12. The improvement according to claim 11, wherein two of said plate-like crystal members are assembled with the first roughened major surface of a first of said two crystal members being optically coupled with said coupling means, the second roughened major surface of a second of said two crystal members being optically coupled to said perfect reflector, and the second roughened major surface of said first crystal member contacting the first roughened major surface of said second crystal member.

13. The improvement according to claim 12, wherein the thickness of the assembled two crystal members is from 10 to 15 mm.

14. The improvement according to claim 11, wherein said plate-like crystal member produces light in response to impingement of gamma rays thereon, said crystal member having a thickness of 0.5 to 6 mm.

15. The improvement according to claim 14, wherein said thickness of said plate-like crystal member is from 2 to 6 mm.

16. In a scintillator apparatus including a scintillating crystal structure for producing light rays and means for coupling said light rays toward a photomultiplier, the improvement comprising said scintillating crystal structure including at least one crystal being a plate-like member having a first major surface facing toward said photomultiplier through said coupling means and a second major surface facing toward a perfect diffusion reflector, both of said first and second major surfaces being roughened to form a light diffuser.

17. The improvement according to claim 16, wherein two of said plate-like crystal members are assembled with the first roughened major surface of a first of said two crystal members being optically coupled with said coupling means, the second roughened major surface of a second of said two crystal members being optically coupled to said perfect reflector, and the second roughened major surface of said first crystal member contacting the first roughened major surface of said second crystal member.

18. The improvement according to claim 17, wherein the thickness of the assembled two crystal members is from 10 to 15 mm.

19. The improvement according to claim 16, wherein said plate-like crystal member produces light in response to impingement of gamma rays thereon, said crystal member having a thickness of 0.5 to 6 mm.

20. The improvement according to claim 19, wherein said thickness of said plate-like crystal member is from 2 to 6 mm.

* * * * *